June 9, 1959
G. A. MacQUEEN
2,889,926
ORE SEPARATOR
Filed Jan. 11, 1957
2 Sheets-Sheet 1
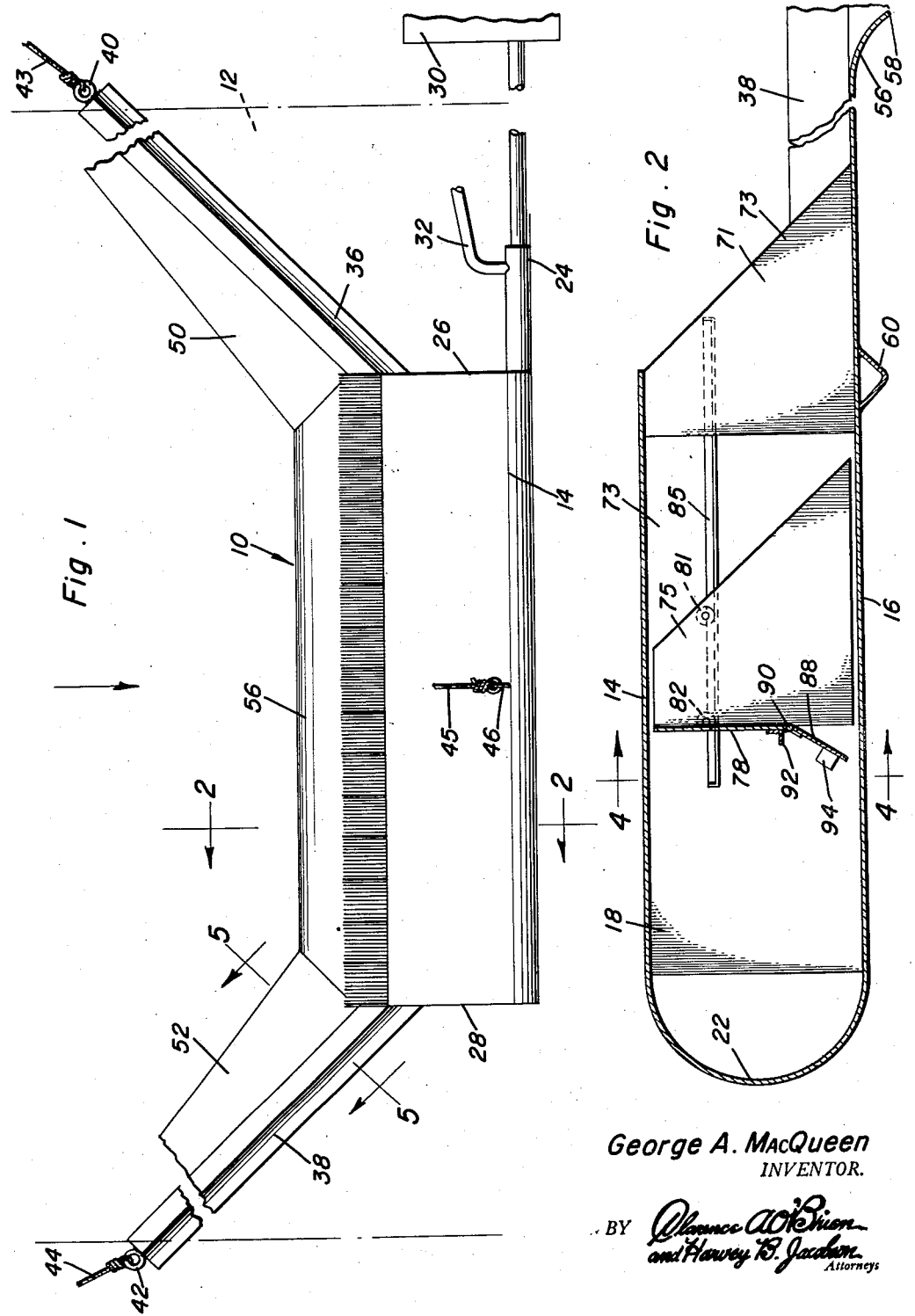
George A. MacQueen
INVENTOR.
BY June 9, 1959     G. A. MacQUEEN     2,889,926
ORE SEPARATOR
Filed Jan. 11, 1957     2 Sheets-Sheet 2
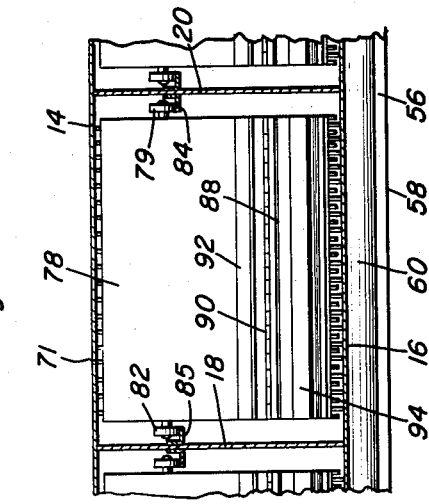
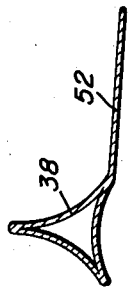
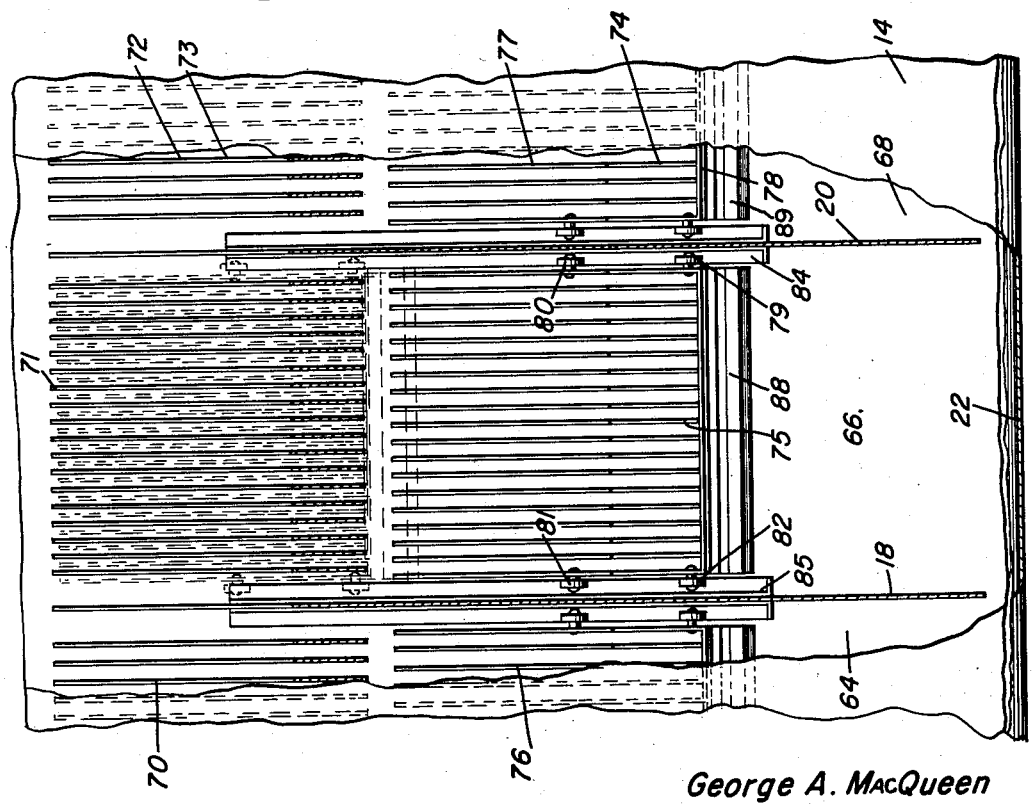
George A. MacQueen
INVENTOR.

United States Patent Office 2,889,926
Patented June 9, 1959

2,889,926
ORE SEPARATOR
George A. MacQueen, Edmonton, Alberta, Canada
Application January 11, 1957, Serial No. 633,605
5 Claims. (Cl. 209—379)

This invention relates to separators and more particularly to a separator which is adapted to separate placer ore material from gravel waste in the bed of a flowing river.

One of the principal problems arising in the process of separating ore from gravel waste, sand, etc. in the bed of a flowing river is that of keeping the grating clear of heavy material and jamming particles of gravel. Accordingly, an object of the present invention is to provide a separator which successfully overcomes this problem, as well as others. The invention is capable of being used to separate and grade different sizes of gravel, as well as to separate the more desirable ore from waste.

A further object of the present invention is to provide a separator which is adapted to rest on or in the bed of the flowing stream, river or the like, the separator having a casing into which the water from the flowing river is adapted to pass, but while so doing travels through a grating, there being means operatively connected with the grating for periodically clearing the grating while the ore, together with some of the water, is drained and conducted to a hopper or the like which is located in a remote place from the river or other stream of flowing water.

A further object of the present invention is to provide a practical device of the nature to be described wherein it serves its intended purpose effectively and enables a greater yield of placer ore material by facilitating the cleaning of the grates.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of a separator which is constructed in accordance with the invention, this view showing the separator disposed in a schematically represented river or other stream of flowing water bed;

Figure 2 is a sectional view taken approximately on the line 2—2 of Figure 1;

Figure 3 is a fragmentary, enlarged plan view with parts broken away in section to illustrate internal detail and this view shows principally the means to maintain the grating free from large stones, particles of gravel and other waste;

Figure 4 is a sectional view taken approximately on the line 4—4 of Figure 2, again showing principally the means to keep the grating in a relatively clean condition; and Figure 5 is an enlarged sectional view taken approximately on the line 5—5 of Figure 1 to show a detail of construction.

In the accompanying drawings there is a separator 10 which is located in the bed of a flowing stream of water, as river 12. The flow of liquid is as indicated by the direction arrow.

Separator 10 is made of a casing or housing which has a top wall 14, a bottom wall 16 parallel thereto but spaced therefrom by means of vertical separators, as at 18 and 20, there being any number of such vertical separators, depending on the size of the housing, the capacity of the separator and other design factors. In any case, it is preferred that the separators be flat plates extending vertically between the top and bottom walls 14 and 16, respectively, of the casing. The rear wall 22 of the casing is arcuate in cross section and forms a chamber in which liquid and ore is accumulated while constantly being drawn off through pipe 24. This pipe is attached in registry with an opening in side wall 26 of the casing, while the opposite side wall 28 is imperforate. The pipe 24 leads to the hopper 30 or some other receptacle which is located on the outside of the stream. A water pressure pipe 32 is attached in registry with the bore of the pipe 24 and is adapted to receive water under pressure to propel the ore-laden liquid through pipe 24 and into hopper 30.

Outwardly diverging arms 36 and 38, each being made of three interconnected, slightly curved strips to form a triangular cross section (Figure 5), extend from the sides 26 and 28 of the casing and have means at the ends thereof to which cables, ropes or like fasteners may be attached. These means are shown as eyes 40 and 42 to which the cables 43 and 44 are secured. The opposite ends of the cables (not shown) are anchored. In installing the separator, the bottom wall 16 is placed on the river bed and the cables 43 and 44 are anchored in place, making sure that the separator is firmly held. Central cable 45 on eye 46 fastened to top wall 14 also aids in this function.

A forwardly extending flat plate 50 is attached to the arm 36, while a similar flat plate 52 is attached to the arm 38, these flat plates constituting aprons and inclined slightly downwardly as they proceed forwardly. Accordingly, the aprons 50 and 52 cooperate with the front surfaces of the arms 36 and 38 to direct the lower level or layer of moving liquid in the stream 12 toward the center apron 56 which extends completely across the open front of the casing. The front edge 58 (Figure 2) of the apron 56 is angulated downwardly in order to be engaged in the river bed. A strengthening angle-iron rib 60 which extends transversely across the bottom surface of the casing also aids in holding the separator in place, but has the principal function of lending rigidity to the entire structure.

The vertical separators, for example those seen at 18 and 20, divide the casing into bays 64, 66 and 68, and there are grates 70, 71 and 72 in the three illustrated bays. The construction of each grate is similar, being made of a series of vertical baffles 73 in the form of flat plates and attached respectively to the upper and lower walls 14 and 16 of the casing. Travellers 74, 75 and 76, respectively, are operatively connected with the three grates 72, 71 and 70 and they function to clean the latter. The travellers each consist of a group of vertically disposed baffles 77 of flat plate configuration and held spaced apart equidistant by means of a back wall 78 which terminates above the surface of the bottom wall 16 of casing. The spacing of the baffles 77 is such that they are capable of being interleaved with the baffles 73 of grate 72. The same holds true for the other travellers and each with its associated grate. There are means connected with each traveller for mounting it so that it is capable of such movement. The means are all the same for each traveller, a typical construction being seen in connection with traveller 75 and involving four wheels 79, 80, 81 and 82 which are mounted on laterally protruding spindles of the end baffles of the traveller 75. The wheels 79, 80, 81 and 82 are mounted for rotation on rails 84 and 85, the latter being preferably angle-irons with stops at the ends thereof and welded or otherwise rigidly secured to the separators 18 and 20.

There is a swinging door on each traveller. Door 88 is on traveller 75, while door 89 is on traveller 74. Each door is constructed similarly, being made of a flat plate connected by a hinge, as at 90 (Figure 2), to a lower edge of the back wall 78 and immediately below the angular stop 92, this preventing the traveller from moving too far into its bay and more particularly moving too far into the grate which it maintains in a clean condition. Counterweight 94 is on the door 88 and there is a similar counterweight on all of the other corresponding doors. Accordingly, although the door is capable of being swung up to a level position, it is stopped by stop 92 and weight 94 aids the return of the door.

In operation, the separator 10 is located in a stream as described previously. The ore separation takes place by having the gravel, ore and other material at the level of the river bed flow over the apron 56 and into the separator proper. The grates in the various bays sift out the larger objects, while the lower level only of the flowing material is passed through the travellers and more particularly through the doors thereof. Water entering pipe 32 aids in drawing the ore-laden liquid from the chamber at the back wall 22 of the separator. This liquid under pressure through pipe 32 also helps to deposit it in the hopper 30 or some other receptacle.

Periodically and as found necessary, the travellers are moved forward in the casing so that the baffles thereof push the gravel, stones or other foreign objects that have been lodged in the grates therefrom and back into the stream.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A separator for use in the bed of a flowing stream, said separator comprising a forwardly opening casing, a grate composed of a plurality of parallel spaced baffles and located within said casing in order to strain the liquid as it passes into said casing, means in said casing downstream of said grate to withdraw the ore-laden liquid therefrom, means within said casing for periodically cleaning said grate, said cleaning means comprising a traveller which is made of a plurality of parallel plates held spaced apart a distance to fit within the plates of said grate, and means mounting said traveller for sliding movement within said casing and between the plates of said grate, said traveller mounting means comprising a plurality of rails, dividers in said casing separating said casing into bays and supporting said rails, and wheels on said traveller located on said rails.

2. The combination of claim 1 wherein said traveller has a back wall whose lower edge terminates at a distance from the surface of the bottom wall of said casing, and a door hinged at the lower edge of said wall of said traveller to control and regulate admittance of liquid into the chamber formed by said casing behind said traveller.

3. The combination of claim 1 wherein said casing has laterally extending arms which function as baffles to direct the ore-laden liquid into the open front of said casing.

4. The combination of claim 1 wherein said casing has laterally extending arms which function as baffles to direct the ore-laden liquid into the open front of said casing, a forwardly extending apron on said casing at the front lower edge thereof and having its edge turned downward to anchor within the bed of the stream.

5. The combination of claim 1 wherein said casing has laterally extending arms which function as baffles to direct the ore-laden liquid into the open front of said casing, a forwardly extending apron on said casing at the front lower edge thereof and having its edge turned downward to anchor within the bed of the stream, and forwardly extending aprons on said arms and merged with the apron on said casing and at a slight angle thereto.

References Cited in the file of this patent

UNITED STATES PATENTS

| | | |
|---|---|---|
| 12,069 | Perry | Dec. 12, 1854 |
| 685,844 | Johnson | Nov. 5, 1901 |
| 1,317,479 | Buck | Sept. 30, 1919 |
| 1,392,505 | Johnson | Oct. 4, 1921 |

FOREIGN PATENTS

| | | |
|---|---|---|
| 5,682 | Great Britain | Nov. 29, 1882 |